United States Patent
Ilyes et al.

(10) Patent No.: US 6,433,493 B1
(45) Date of Patent: Aug. 13, 2002

(54) ELECTRONIC POWER CONVERTER FOR TRIAC BASED CONTROLLER CIRCUITS

(75) Inventors: Laszlo S. Ilyes, Richmond Heights; Louis R. Nerone, Brecksville, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/749,343

(22) Filed: Dec. 27, 2000

(51) Int. Cl.$^7$ ................................................ G05F 1/00
(52) U.S. Cl. .................. 315/291; 315/200 R; 315/224; 315/283; 315/DIG. 4
(58) Field of Search .................. 315/200 R, 209 R, 315/224, 225, 226, 246, 267, 276, 283, 291, 307, 344, DIG. 4

(56) References Cited

U.S. PATENT DOCUMENTS

| | | | |
|---|---|---|---|
| 4,862,041 A | 8/1989 | Hirschmann | 315/246 |
| 4,998,044 A | 3/1991 | Nilssen | 315/200 C |
| 5,510,679 A | 4/1996 | Maiale, Jr. et al. | 315/194 |
| 5,650,694 A * | 7/1997 | Jayaraman et al. | |
| 5,874,810 A | 2/1999 | Nerone | 315/248 |
| 5,877,595 A | 3/1999 | Nerone | 315/209 R |
| 5,914,570 A | 6/1999 | Nerone et al. | 315/209 R |
| 5,917,289 A | 6/1999 | Nerone et al. | 315/209 R |
| 5,952,790 A | 9/1999 | Nerone et al. | 315/209 R |
| 5,982,110 A * | 11/1999 | Gradzki | 315/247 |
| 5,986,410 A | 11/1999 | Nerone | 315/209 R |
| 6,018,220 A | 1/2000 | Nerone | 315/219 |
| 6,051,934 A | 4/2000 | Nerone | 316/209 R |
| 6,057,648 A | 5/2000 | Nerone et al. | 315/209 R |
| 6,078,143 A | 6/2000 | Nerone | 315/209 R |
| 6,111,363 A | 8/2000 | Nerone | 315/225 |
| 6,150,769 A | 11/2000 | Nerone et al. | 315/209 R |

FOREIGN PATENT DOCUMENTS

| | | |
|---|---|---|
| WO | 96/081230 | 3/1996 |
| WO | 99/12187 | 3/1999 |

OTHER PUBLICATIONS

English Abstract of PCT WO 96/08123.

* cited by examiner

Primary Examiner—Don Wong
Assistant Examiner—Thuy Vinh Tran
(74) Attorney, Agent, or Firm—Fay, Sharpe, Fagan, Minnich & McKee, LLP

(57) ABSTRACT

A ballast circuit operable with a triac based controller circuit, the ballast circuit (100) includes a rectifier (115) configured for operative connection with an associated triac based circuit (110) for converting AC current to DC current, a capacitor assembly (137) coupled to the rectifier (115), a first connection (150) between the rectifier and the capacitor assembly (137), a converter (153) coupled to the rectifier (115) for converting the DC current to AC current, a gate drive arrangement coupled to the converter for controlling the converter (153), a resistance-inductance circuit (163) coupled to the converter (153), and a second connection (165) between the capacitor assembly (137) and the resistance-inductance circuit (163). The converter (153) induces AC current in the resistance-inductance circuit (163).

32 Claims, 3 Drawing Sheets

ELECTRONIC POWER CONVERTER FOR TRIAC BASED CONTROLLER CIRCUITS

BACKGROUND OF THE INVENTION

1. Field of the Invention

This application relates to an electrical circuit, and in particular, to a converter circuit which is compatible with a triac based circuit.

2. Discussion of the Art

Incandescent lamps have widespread use in a variety of applications. Typically, incandescent lamps use mains or line voltage for power although in selected circumstances, low voltage is desired. For example, color rendering characteristics and light beam control are distinct advantages with low voltage lamps. Low voltage lamps, however, require a voltage lower than the line voltage because of the voltage rating of the lamp filaments. An exemplary line voltage is about 120 V, but certain lamp filaments, such as those found in MR16 lamps, have voltage ratings of only approximately 12 V. Thus, low voltage lamps require converters to reduce the line voltage to match the requirements of the lamp filament.

Although low voltage lamps have better optical light quality than high voltage lamps, the use of low voltage lamps in the business area (e.g., restaurants, commercial establishments, etc.) has not yet found widespread adoption. One reason for this may be attributed to the fact that many business establishments also desire dimmable lamps. For example, many restaurants want brighter light output during lunch hours to accommodate business lunches and want to have the capability to dim the lights during dinner hours for a more personal and private ambiance.

In order to use the low voltage lamps in traditional lamp sockets, it is known in the art to place lamps having small, integral electronic converters within existing fixtures. Typical electronic converters, however, are not readily compatible with the wide variety of commercially available triac based circuits which are prevalent in the consumer, retail, restaurant, and hotel lighting markets. Common triac based control circuits include wall dimmers and solid state switches activated by photo sensors, motion sensors, occupancy detectors, and timer controls.

Common mode chokes and resistors have been used to damp oscillations which are otherwise caused by a triac based phase dimmer circuit. While this approach provides dimming capability, it presents other problems. First, the dimensions of the outer lamp envelope constrain the size of converter circuits. Use of an inductor of 50 mH, for example, is not practical since it is a fairly large component. Additionally, the resistors compromise the efficiency of the circuit by introducing an additional (i.e., non-light producing) load to discharge the resistive-capacitive (RC) element in the dimmer circuit.

Yet another approach is to design a custom dimmable converter circuit for a low voltage lamp. This solution, however, fails to take advantage of the many available dimmer circuits already in existence. Further, if the custom design requires that the dimmer circuit be integral with the lamp, each lamp to would have to be dimmed individually. The lamp would not have the capability of being dimmed by traditional dimmer circuits, which generally have the capability control entire light fixtures, not just a single lamp. Thus, more time and labor would be required to dim the lamps, and the dimming amount may not be uniform throughout the establishment.

Accordingly, a need exists for a converter circuit compatible with commercially available triac based circuits.

BRIEF SUMMARY OF THE INVENTION

A high frequency electronic power converter, which allows a low voltage lamp to be connected to standard consumer mains AC voltage through a triac based circuit, is disclosed.

An exemplary embodiment of the present invention concerns a ballast circuit operable with a triac based controller. The ballast circuit includes a rectifier configured for operative connection with an associated triac based circuit for converting AC current to DC current, a capacitor assembly coupled to the rectifier, a first connection between the rectifier and the capacitor assembly, a converter coupled to the rectifier for converting the DC current to AC current, a gate drive arrangement coupled to the converter for controlling the converter, a resistance-inductance circuit coupled to the converter, and a second connection between the capacitor assembly and the resistance-inductance circuit. The converter induces AC current in the resistance-inductance circuit.

DETAILED DESCRIPTION OF THE INVENTION

Figure 1:
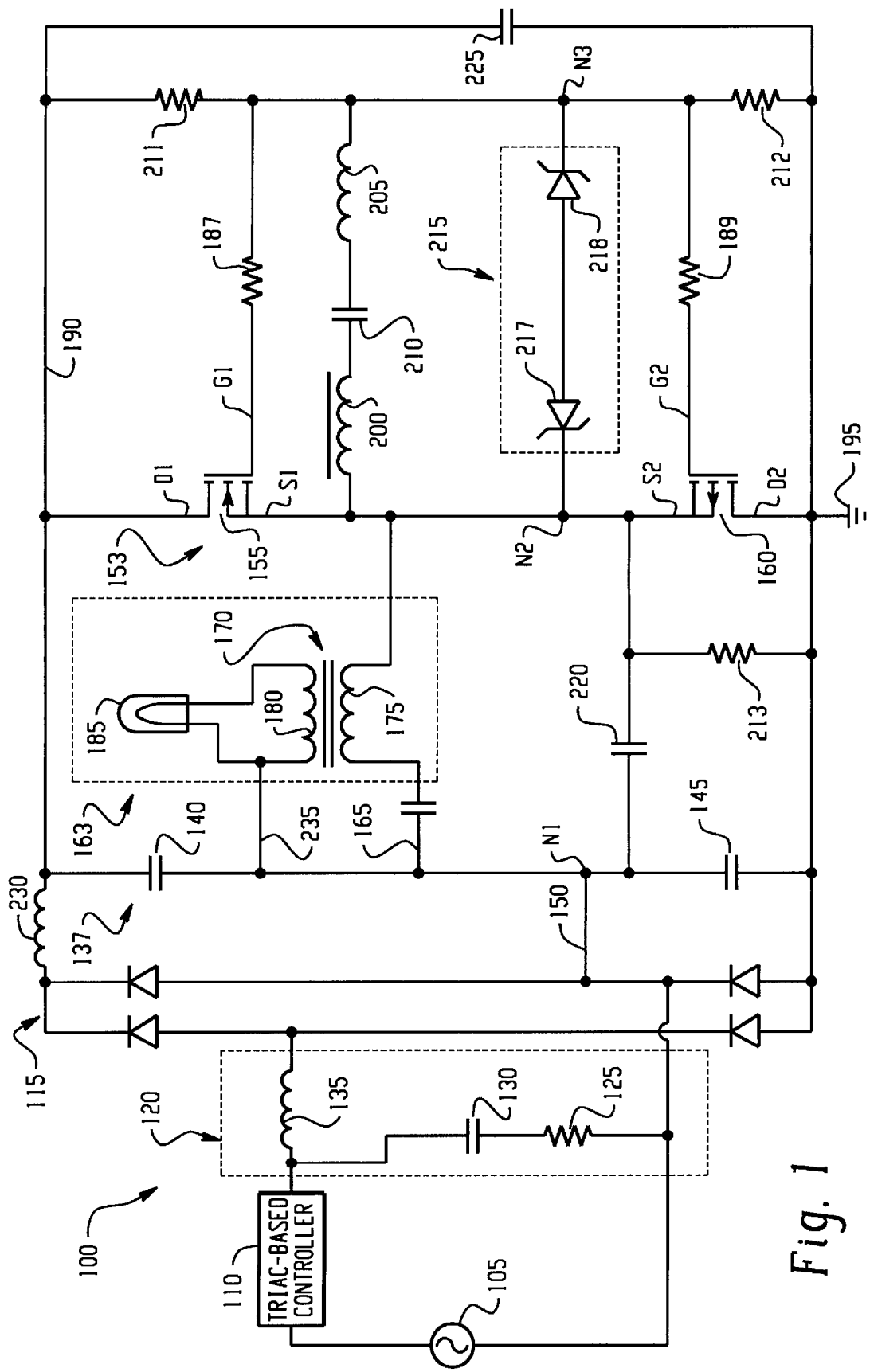
FIG. 1 is a schematic diagram of a converter circuit embodying the present invention.

With reference to the Figures, several embodiments of the present invention are shown and will now be described. Like reference numerals are used to indicate the same element throughout the specification.

A ballast or converter circuit 100 includes an AC source 105 coupled to a triac based controller 110 in the embodiment of FIG. 1. The AC source is generally the standard consumer mains or line voltage. The triac based controller 110 is typically a commercially available phase controlled triac dimmer prevalent in consumer, retail, restaurant, and hotel lighting markets, such as General Electric Company incandescent light dimmer, part number DIT261 M5. The triac based controller circuit may also be a solid state switch which controls the on-off operation of a lamp, such as a dusk-to-dawn controller.

The triac based controller 110 is coupled to a rectifier 115, such as a full-wave bridge rectifier, which converts AC current to DC current. An electromagnetic interference (EMI) filter 120 is preferably interposed between the triac based controller 110 and the bridge rectifier 115. The EMI filter 120 suppresses EMI from adjacent electrical devices. The EMI filter includes a resistor 125, a capacitor 130, and an inductor 135, where the capacitor and resistor are serially connected as shown in FIG. 1, and the inductor is coupled between the triac based controller 110 and rectifier 115.

The bridge rectifier 115 is coupled in parallel to a capacitor assembly 137. The capacitor assembly 137 includes capacitors 140 and 145, which are standard half-bridge. The bridge rectifier 115 is further coupled to the capacitor assembly 137 via a first or direct electrical connection 150. For example, a jumper connection suitably interconnects the bridge rectifier 115 at connection node N1 between the half-bridge capacitors 140 and 145. The half-bridge capacitors 140 and 145, which maintain the connection node N1 at about one-half bus voltage $V_{BUS}$, are connected in parallel to a DC-to-AC converter 153.

The DC-to-AC converter 153, which includes first and second switches 155 and 160, converts the DC current received from the output of the bridge rectifier 115 to an AC current. The AC current is received by a resistance-inductance circuit 163 via a second or capacitive connection 165, shown as a decoupling capacitor in FIG. 1. The resistance-inductance circuit 163 includes a high frequency transformer 170, which has a primary winding 175 and a secondary winding 180, and a load 185, shown as a lamp in FIG. 1. The lamp may be any number of low voltage lamps, such as a low voltage incandescent lamp.

The first and second switches 155 and 160 are complementary to each other in the sense that the first switch 155 may be an n-channel enhancement mode device as shown, and the second switch 160 is a p-channel enhancement mode device, or what are common referred to as MOSFET switches. Each of the first and second switches 155, 160 has a respective gate (or control terminal) G1 or G2, respectively. The voltage from gate G1 to source (reference terminal) S1 of the first switch 155 controls the conduction state of that switch. Similarly, the voltage from gate G2 to source S2 of the second switch 160 controls the conduction state of that switch. As illustrated, sources S1 and S2 are connected together at a common node N2 and the gates G1 and G2 are interconnected at the common control node N3. The gates G1 and G2 may be coupled to gate resistors 187 and 189 to prevent over rating of the gate-to-source resonance and improve reliability of the converter circuit 100. Drains D1 and D2 of the first and second switches 155 and 160 are connected to a bus conductor 190 and a reference conductor 195, respectively. The reference conductor 195 is shown for convenience as a ground. DC bus voltage $V_{BUS}$ exists between the bus conductor 190 and the reference conductor 195.

The DC-to-AC converter 153 is coupled to a gate drive circuit, which comprises a driving inductor 200, a second inductor 205, and a blocking capacitor 210. The gate drive circuit is coupled to three starting resistors 211, 212, and 213. Together, the starting resistors 211, 212, and 213 and the first switch 155 form a self-starting circuit as is well-known in the art.

A bi-directional voltage clamp 215, is disposed in parallel relation with the gate drive circuit between common control node N3 and the common node N2. The bi-directional voltage clamp 215 is preferably comprised of back-to-back Zener diodes 217, 218. The bi-directional voltage clamp 215 clamps positive and negative excursions of gate-to-source voltage ratings of the first and second switches 155 and 160 so that gate-to-source maximum ratings of the switches are not exceeded.

A snubber capacitor 220 is preferably connected between the connection node N1 and the common node N2 to protect the first and second switches 155 and 160 from exceeding maximum gate-to-source voltage ratings during a dead time interval when the first and second switches 155 and 160 are both off. The converter circuit 100 may also include a gate or swamp capacitor 225 across the DC bus. The gate capacitor 225 supports the converter operation following a zero-crossing of the line voltage.

The converter circuit 100 may further include a second EMI filter 230, shown as an inductor, connected in series between the bridge rectifier 115 and the bridge capacitor 140 to further suppress EMI at the output of the bridge rectifier 115. Depending upon the other EMI control measures taken, it may also be desirable to have a third connection 235 between the secondary winding 180 of the high frequency transformer 170 and the node N1 between the half-bridge capacitors 140 and 145. The third connection 235 may be a direct electrical connection. The third connection may also be a capacitive connection in applications where a direct electrical connection would be detrimental to the performance of the product.

The converter circuit 100 operates as follows. The bridge rectifier 115 converts AC current from the source 105 to DC current. The first and second switches 155 and 160 are alternately switched at high frequency by the self-resonating converter circuit 153 to drive the primary winding 175 of the high frequency transformer 170. The secondary winding 180 of the high frequency transformer 170 drives the load 185. The capacitive connection 165 is used to decouple high frequency switching from the low frequency line. The half-bridge midpoint voltage is referenced to the line to provide a low frequency current path back to the load 185 to maintain compatibility with the triac based controller 110. The EMI filter 120 at the circuit input and the secondary winding 180 of the high frequency transformer 170 are referenced to the half-bridge midpoint voltage to help further suppress EMI.

The self-starting circuit provides a path for input from a source to start inductor action. The blocking capacitor 210 becomes initially charged upon energizing of the AC source 105, via the resistors 211, 212, and 213. At this instant, the voltage across the blocking capacitor 210 is zero. During the starting process, the driving inductor 200 and the primary winding 175 of the high frequency transformer 170 act essentially as a short circuit due to the relatively long time constant for charging of the blocking capacitor 210. Upon initial bus energizing, the voltage on the common node N2 is approximately one-third of the bus voltage $V_{BUS}$ with resistors 211, 212, and 213 being of equal value, for instance. The voltage at the common control node N3 between the resistors 211, 212, and 213 is one-half of the bus voltage $V_{BUS}$. In this manner, the blocking capacitor 210 becomes increasingly charged, from left to right, until it reaches the threshold voltage of the gate-to-source voltage of the first switch 155 (e.g., 2–3 volts). At this point, the first switch 155 switches into a conduction mode, which then results in current being supplied by the first switch 155 to the primary winding 175 of the high frequency transformer 170. The secondary winding 180 of the high frequency transformer 170 drives the load 185. In turn, the resulting current in the transformer 170 causes regenerative control of the first and second switches 155 and 160 in the manner described above.

During steady state operation of the converter circuit 100, the voltage of the common node N2 between the first and second switches 155 and 160 becomes approximately ½ of the bus voltage $V_{BUS}$. The voltage at the common control node N3 also becomes approximately ½ of the bus voltage $V_{BUS}$ so that the blocking capacitor 210 cannot again, during steady state operation, become charged and create another starting pulse for turning on the first switch 155. The capacitive reactance of the blocking capacitor 210 is much smaller than the inductive reactance of the driving inductor 200 and the second inductor 205 so that the blocking capacitor 210 does not interfere with the operation of the driving inductor 200 and second inductor 205.

The driving inductor 200 of the gate drive circuit is mutually coupled to the primary winding 175 of the high frequency transformer 170 in such a manner that a voltage is induced therein which is proportional to the instantaneous rate of change of an AC load current. The driving inductor 200 is further connected at one end to the common node N2. The driving inductor 200 provides the driving energy for operation of the gate drive circuit. The second inductor 205, which is serially connected to the blocking capacitor 210 and the common control node N3, is used to adjust the phase angle of the gate-to-source voltage appearing between common control node N3 and common node N2.

The converter circuit 100 continues to operate at low line conditions and restarts quickly when the triac based controller 110 triggers. A current pathway is provided which allows a resistor-capacitor (RC) network of the triac based controller 110 to discharge and provide consistent operation of the triac based controller 110. The passive EMI filter 120, which limits the line current and damps oscillations which might be caused by the firing of the triac based controller 110, is applied. Thus, the converter circuit 100 is compatible with a wide variety of commercially available triac based controllers.

Exemplary component values for the converter circuit 100 are as follows, with a line voltage of 120V:

| | |
|---|---|
| Zener diodes 215 | 10 V - ¼ Watt |
| Diodes of full-wave bridge rectifier 115 | 1N4006 |
| Gate capacitor 225 | 100 nanofarads, 200 V |
| Half-bridge capacitors 140, 145 | 100 nanofarads, 100 V |
| Decoupling capacitor 165 | 100 nanofarads, 100 V |
| Gate resistors 187, 189 | 10 ohms |
| EMI filter capacitor 130 | 100 nanofarads, 200 V |
| Blocking capacitor 210 | 100 nanofarads, 25 V |
| Snubber capacitor 220 | 680 picofarads, 200 V |
| Starting resistors 211, 212, 213 | 270 k ohms |
| EMI filter resistor 125 | 100 ohms |

Additionally, the first switch 155 may be an IRFU214, n-channel MOSFET, and the second switch 160 may be an IRFU9214, p-channel MOSFET, both of which are sold by International Rectifier Company, of El Segundo, Calif.

Figure 2:
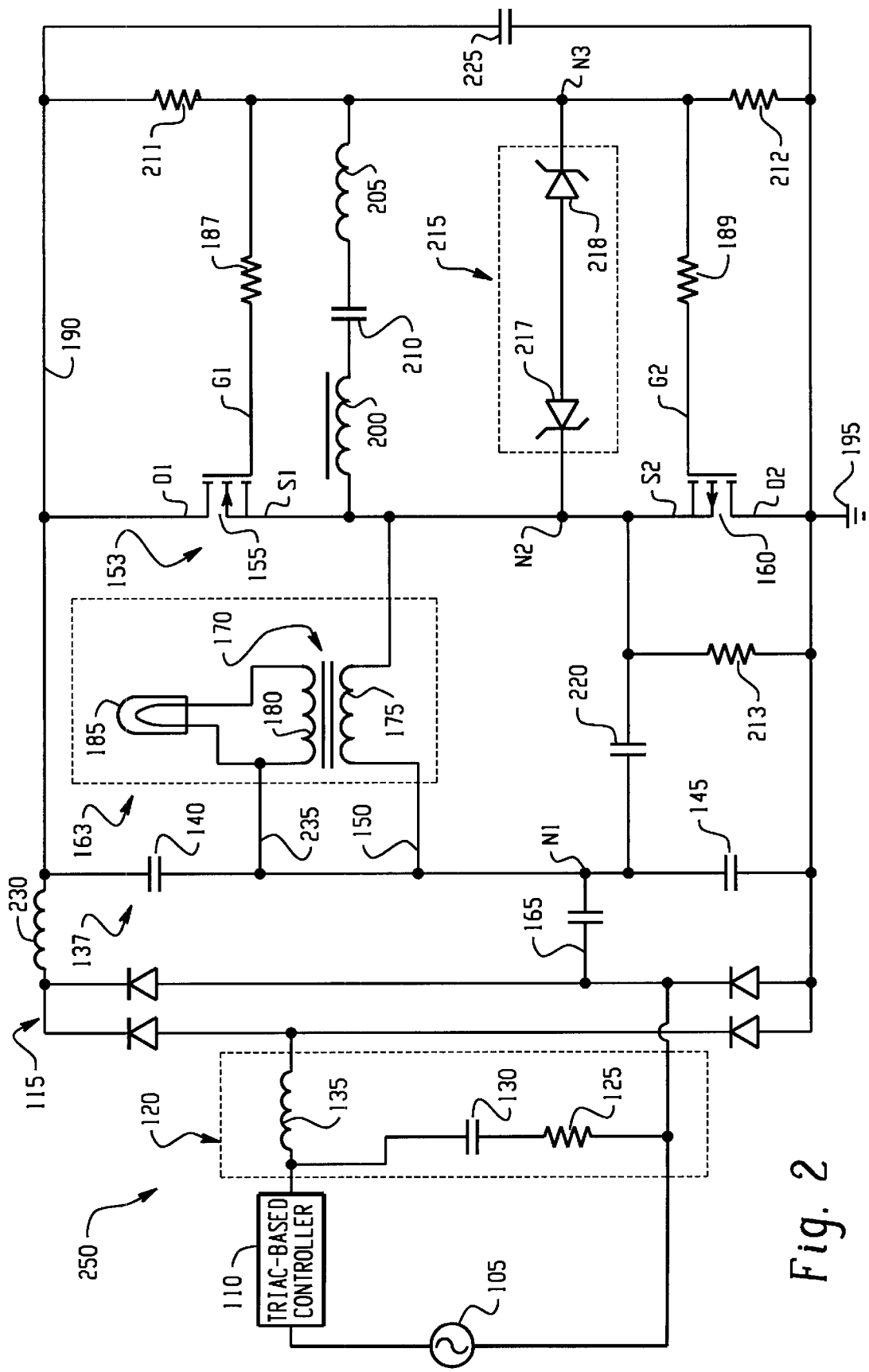
FIG. 2 is a schematic diagram of a second converter circuit embodying the present invention.

FIG. 2 is a schematic diagram of a second converter circuit 250 embodying the present invention. The second converter circuit 250 functions in the same manner as the converter circuit 100 of FIG. 1 described above. The primary difference between the second converter circuit 250 and the converter circuit 100 resides in the placement of the direct electrical connection 150 and the capacitive connection 165. As shown in FIG. 2, the capacitive connection 165 of the converter circuit 250 is located between the connection node N1 and the bridge rectifier 115 while the direct electrical connection 150 is located between the connection node N1 and the primary winding 175. Thus, the placement of the direct electrical connection 150 and the capacitive connection 165 are opposite of that shown in FIG. 1.

Figure 3:
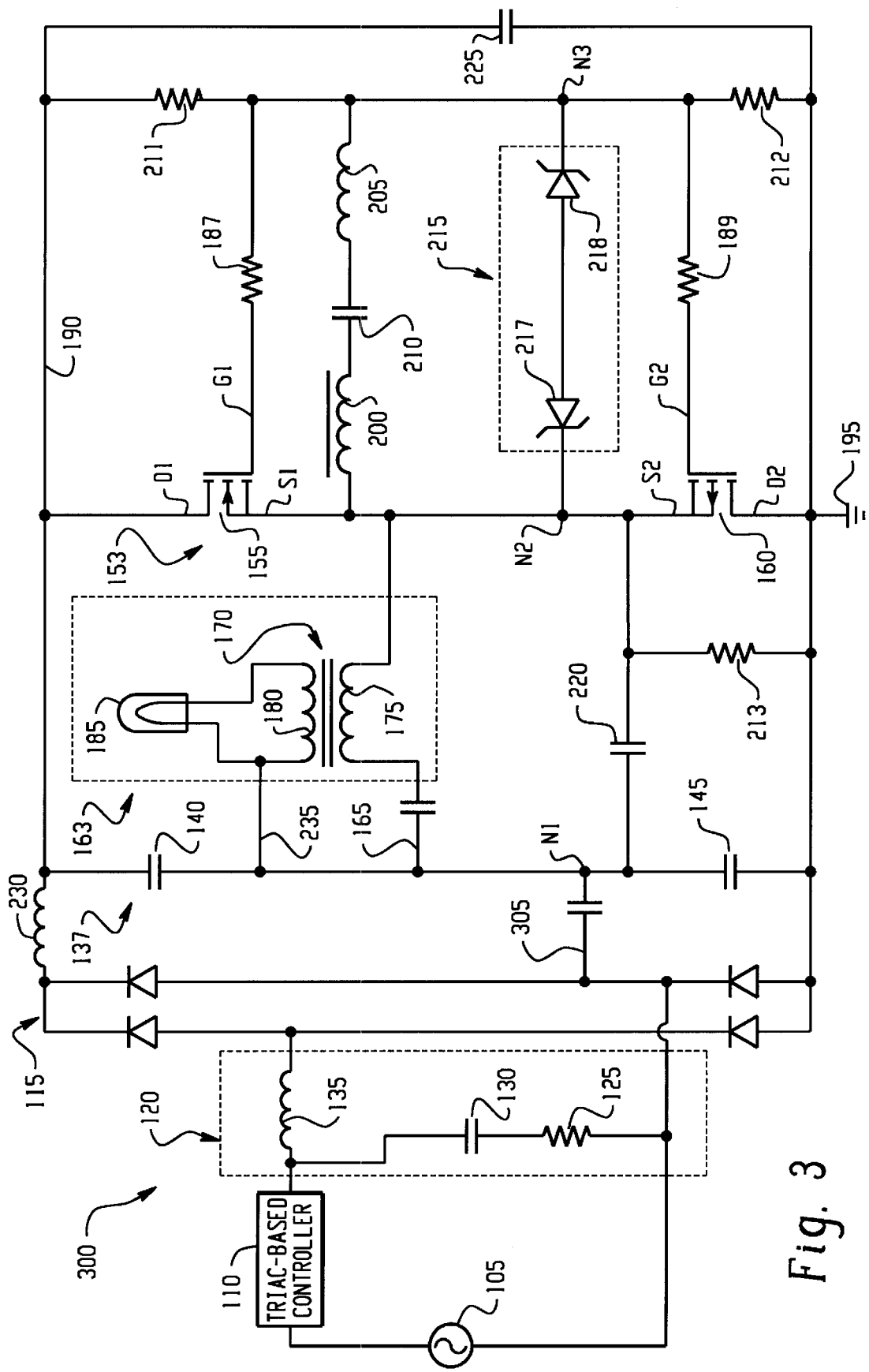
FIG. 3 is a schematic diagram of a third converter circuit embodying the present invention.

FIG. 3 is a schematic diagram of a third converter circuit 300 embodying the present invention. Again, the third converter circuit 300 functions in the same manner as the converter circuit 100 of FIG. 1 and uses the identical components, with the exception of the direct electrical connection 150 between the bridge rectifier 115 and the node N1 shown in FIG. 1. In the converter circuit 300, the direct electrical connection 150 is replaced with a capacitive connection 305, shown as a second decoupling capacitor in FIG. 3. This capacitive connection 305 replaces the direct electrical connection 150 of the converter circuit 100, which may be desirable for small performance variations, such as reducing the peak filament voltage in a lamp. Thus, the converter circuit 300 has two capacitive connections 165 and 305 instead of one capacitive connection and one direct electrical connection, as in the converter circuit 100 described above.

In summary, the present invention provides a manner of efficiently using integrated circuit components with a commercially available triac based controller. The circuit is small enough such that it may be easily integrated within the lamp housing itself, thereby providing a low voltage lamp which is easily retrofitted to existing incandescent lamp fixtures. This converter also provides a low current crest factor at high frequency to the lamp filament, which is conducive to long lamp life.

Furthermore, since numerous modifications and variations will readily occur to those skilled in the art, it is not desired that the present invention be limited to the exact construction and operation illustrated and described herein. Accordingly, all suitable modifications and equivalents which may be resorted to are intended to fall within the scope of the claims.

What is claimed is:

1. A ballast circuit operable with a triac based controller, comprising:
    (a) a rectifier configured for operative connection with an associated triac based circuit for converting AC current to DC current;
    (b) a capacitor assembly coupled to the rectifier;
    (c) a first connection between the rectifier and the capacitor assembly;
    (d) a converter coupled to the rectifier for converting the DC current to AC current;
    (e) a gate drive arrangement coupled to the converter for controlling the converter;
    (f) a transformer circuit coupled to the converter, the converter inducing the AC current in the transformer circuit;
    (g) a second connection between the capacitor assembly and a primary winding of the transformer circuit; and
    (h) a third connection between the capacitor assembly and a secondary winding of the transformer.

2. The ballast circuit of claim 1, wherein the triac based controller is a dimmer.

3. The ballast circuit of claim 1, wherein the triac based controller is a solid state switch.

4. The ballast circuit of claim 1, wherein the capacitor assembly includes first and second capacitors connected together at a connection node.

5. The ballast circuit of claim 1, further comprising a third capacitor coupled in parallel to the converter for supporting operation of the converter.

6. The ballast circuit of claim 1, wherein the first connection is a direct electrical connection.

7. The ballast circuit of claim 1, wherein the first connection is a capacitive connection for decoupling high frequency switching.

8. The ballast circuit of claim 1, wherein the second connection is a direct electrical connection.

9. The ballast circuit of claim 1, wherein the second connection is a capacitive connection for decoupling high frequency switching.

10. The ballast circuit of claim 1, wherein the first and second connections are capacitive connections for decoupling high frequency switching.

11. The ballast circuit of claim 1, further including a lamp connected to the transformer.

12. The ballast circuit of claim 1, further comprising a starting circuit coupled to the converter.

13. The ballast circuit of claim 1, further comprising an electromagnetic interference filter coupled between the associated triac based circuit and the rectifier.

14. The ballast circuit of claim 1, further comprising an electromagnetic interference filter coupled in series with the rectifier and the capacitor assembly.

15. The ballast circuit of claim 1, wherein the converter includes first and second switches serially connected between a bus conductor and a reference conductor by a common node through which the AC current flows, the first and second switches each including a control node and a reference node, a voltage between the control node and the reference node determining a conduction state of the switches.

16. The circuit of claim 15, further comprising a voltage clamp coupled between the control nodes and the common node.

17. A method of operating a load with a triac based controller, comprising:
   (a) converting AC current to DC current with a rectifier;
   (b) decoupling high frequency switching with by at least one of a capacitive connection (i) between the rectifier and capacitor assembly, (ii) between the capacitor assembly the capacitor assembly and a first winding of the resistance-inductance circuit and (iii) between the capacitor assembly and a second winding of the resistance-inductance circuit;
   (c) converting the DC current to AC current with a converter;
   (d) controlling operation of the converter with a gate drive arrangement coupled to the converter; and
   (e) inducing the AC current in a resistance-inductance circuit coupled to the converter.

18. A ballast circuit operable with a triac based controller, comprising:
   (a) a rectifier configured for operative connection with an associated triac based circuit for converting AC current to DC current;
   (b) a capacitor assembly including first and second capacitors connected together at a connection node and coupled to the rectifier;
   (c) a first connection between the rectifier and the capacitor assembly;
   (d) a converter coupled to the rectifier for converting the DC current to AC current;
   (e) a gate drive arrangement coupled to the converter for controlling the converter;
   (f) a resistance-inductance circuit coupled to the converter, the converter inducing the AC current in the resistance-inductance circuit; and
   (g) a second connection between the capacitor assembly and the resistance-inductance circuit.

19. The ballast circuit of claim 18, wherein the triac based controller is a dimmer.

20. The ballast circuit of claim 18, wherein the triac based controller is a solid state switch.

21. The ballast circuit of claim 18, further comprising third capacitor coupled-in parallel to the converter for supporting operation of the converter.

22. The ballast circuit of claim 18, wherein the first connection is a direct electrical connection.

23. The ballast circuit of claim 18, wherein the first connection is a capacitive connection for decoupling high frequency switching.

24. The ballast circuit of claim 18, wherein the second connection is a direct electrical connection.

25. The ballast circuit of claim 18, wherein the second connection is a capacitive connection for decoupling high frequency switching.

26. The ballast circuit of claim 18, wherein the first and second connections are capacitive connections for decoupling high frequency switching.

27. The ballast circuit of claim 18, wherein the resistance-inductance circuit comprises a transformer and a lamp.

28. The ballast circuit of claim 18, further comprising a third connection between the capacitor assembly and a secondary winding of the transformer.

29. The ballast circuit of claim 18, further comprising a starting circuit coupled to the converter.

30. The ballast circuit of claim 18, further comprising an electromagnetic interference filter coupled between the associated triac based circuit and the rectifier.

31. The ballast circuit of claim 18, further comprising an electromagnetic interference filter coupled in a series with the rectifier and the capacitor assembly.

32. A ballast circuit operable with a triac based controller, comprising:
   (a) a rectifier configured for operative connection with an associated triac based circuit for converting AC current to DC current;
   (b) a capacitor assembly including first and second capacitors connected together at a connection node and coupled to the rectifier;
   (c) a first connection between the rectifier and the capacitor assembly;
   (d) a converter coupled to the rectifier for converting the DC current to AC current, the converter including first and second switches serially connected between a bus conductor and a reference conductor by a common node through which the AC current flows, the first and second switches each including a control node and a reference node, a voltage between the control node and the reference node determining a conduction state of the switches;
   (e) a voltage clamp coupled between the control nodes and the common node;
   (f) a gate drive arrangement coupled to the converter for controlling the converter;
   (g) a resistance-inductance circuit coupled to the converter, the converter inducing the AC current in the resistance-inductance circuit; and
   (h) a second connection between the capacitor assembly and the resistance-inductance circuit.

* * * * *